United States Patent [19]

Tsuboi et al.

[11] Patent Number: 4,631,469
[45] Date of Patent: Dec. 23, 1986

[54] DEVICE FOR DRIVING ELECTRICAL CURRENT GENERATOR FOR USE IN MOTORCYCLE

[75] Inventors: Masaharu Tsuboi; Kuniaki Watanabe, both of Saitama, Japan

[73] Assignee: Honda Giken Kogyo Kabushiki Kaisha, Tokyo, Japan

[21] Appl. No.: 661,881

[22] Filed: Oct. 17, 1984

Related U.S. Application Data

[63] Continuation of Ser. No. 367,517, Apr. 12, 1982, abandoned.

[30] Foreign Application Priority Data

Apr. 14, 1981 [JP] Japan ............................ 56-52686[U]
Apr. 14, 1981 [JP] Japan ............................ 56-55006

[51] Int. Cl.4 ............................................ H02P 15/00
[52] U.S. Cl. ................................... 322/42; 290/1 D
[58] Field of Search ............................... 322/40–43, 322/90; 290/1 C, 1 D

[56] References Cited

U.S. PATENT DOCUMENTS 2,100,076 11/1937 Gilmore ............................ 290/1 D
2,310,081 2/1943 Hill ................................... 290/1 D
2,810,844 10/1957 Morrill ............................. 322/40 X
2,891,213 6/1959 Kern ................................. 322/42
2,900,594 8/1959 Bessiere ........................... 322/40 X
3,012,186 12/1961 Wasko .............................. 322/90

Primary Examiner—R. J. Hickey
Attorney, Agent, or Firm—Sughrue, Mion, Zinn, Macpeak & Seas

[57] ABSTRACT

A device for driving an electrical current generator for use in a motorcycle is disclosed. The electrical current generator is housed within a casing separatedly provided from an engine unit housing an engine. A power transmission means connecting between an output shaft of the engine and a rotary shaft of the generator is provided within a confined space outside of the engine unit. The confined space is defined by a crank casing, a rising flange integrally provided to the crank casing and a cover member. The power transmission means includes a first pulley mounted on one end of the output shaft of the engine, a second pulley mounted on one end of the rotary shaft and a V-belt mounted between the first and second pulleys. The rotation speed ratio of the rotary shaft to the output shaft is changeable in response to the rotation speed of the output shaft.

9 Claims, 6 Drawing Figures

DEVICE FOR DRIVING ELECTRICAL CURRENT GENERATOR FOR USE IN MOTORCYCLE

This is a continuation of application Ser. No. 367,517, filed Apr. 12, 1982, now abandoned.

BACKGROUND OF THE INVENTION

The present invention relates to a device for driving an electrical current generator, and more particularly, to a type thereof for use in a motorcycle.

According to a conventional generator system, the generator is disposed within a limited space, so that it would be rather difficult to perform inspection and overhauling. Further, since the system is located within the limited narrow space, sufficient cooling effect therefor would not be obtainable. Furthermore, according to the conventional device for driving an electrical current generator for use in a motorcycle, a V-belt or chain is mounted between a pulley or sprocket secured to an output shaft of an engine and a pulley or sprocket secured to a rotary shaft of an alternating current generator so as to rotate the generator in response to the rotation of the engine. In case of a big motorcycle, an alternator is often employed as a generator. Therefore, the alternator must on one hand supply sufficient electrical current capable of engine ignition even at the low rotation range of the engine such as engine idling range, and must on the other hand keep maximum rotation even at the maximum speed of the engine to provide constant efficiency. Accordingly, the rotation ratio of the rotary shaft of the generator to the output shaft of the engine must be determined within a limited range to meet with both requirements As shown in broken line in FIG. 4, an output current of the alternator is small at the low rotation range of the engine, particularly at its idling state shown by a region X, so that it would be rather difficult to obtain sufficient electric current charge to a storage battery in case of motorcycle riding at traffic jam condition in night travel during which electrical current for illuminator is particularly required.

SUMMARY OF THE INVENTION

It is therefore, an object of the present invention to overcome the above-mentioned drawbacks and to provide an improved device for driving an electrical current generator for use in a motorcycle.

Another object of this invention is to provide such device capable of conducting easy inspection and overhauling.

Still another object of this invention is to provide such a device capable of providing sufficient electrical current output during low rotation range of the engine, yet providing constant electrical current output during high rotation rage thereof.

These and other objects of the present invention will be attained by providing an electrical current generator separately from an engine unit, and power transmission means including a V-belt and pulleys each positioned at the same side of the motorcycle. The power transmission means is covered with a cover member to provide a confined space by a crank casing, fixing flange and the cover member. The cover member is detachably provided relative to the crank casing.

In order to provide optimum rotation ratio of a rotary shaft of the generator to an output shaft (crank shaft) of the engine, according to a first embodiment, the power transmission means includes a V-belt, a speed responsive pulley mounted on one end of the output shaft, and a centrifugal pulley mounted on one end of the rotary shaft. The centrifugal pulley comprises a ball holding disc fixedly secured to the rotary shaft, an inside pulley disc positioned outside of the ball holding disc and slidable along axial direction of the rotary shaft, a plurality of centrifugal balls supported between the ball holding disc and the inside pulley disc, and an outside pulley disc positioned outside of the inside pulley disc and fixedly secured to the one end of the rotary shaft. Between the inside and outside pulley discs, the V-belt is mounted. Upon rotation of the output shaft, the inside and outside pulley discs are rotated by the belt travel, so that the balls are urged radially outwardly, to thereby move the inside pulley disc toward the outside pulley disc, to thus change effective diameter of the centrifugal pulley. The speed responsive pulley includes a stationary pulley disc fixedly secured to the output shaft, a movable pulley disc positioned outside of said stationary pulley disc and slidable along the output shaft, and a coil spring adapted to urge the movable pulley disc toward the stationary pulley to thus change effective diameter of the speed responsive pulley. The Decrease of the effective diameter of the centrifugal pulley render the effective diameter of the speed responsive pulley to be increased, and vice versa.

According to a second embodiment of the invention, the centrifugal pulley is mounted on one end of the output shaft, and the speed responsive pulley is mounted on one end of the rotary shaft. The centrifugal pulley includes an inside pulley disc fixedly secured to the output shaft, an outside pulley disc positioned outside of the inside pulley disc and slidable along axial direction of the output shaft, a plurality of balls supported between said inside and outside pulley discs, and a coil spring positioned outside of the outside pulley disc and adapted to urge the outside pulley disc toward the inside pulley disc. The speed responsive pulley of the second embodiment includes a stationary pulley disc fixedly secured to the rotary shaft, a movable pulley disc positioned inside of the stationary pulley disc and slidable along axial direction of the rotary shaft, and a coil spring positioned inside of the movable pulley disc and adapted to urge said movable pulley disc toward the stationary pulley disc.

According to a third embodiment of this invention, instead of the employment of the centrifugal pulley and the speed responsive pulley those used in the first and second embodiments, a planetary gear and clutch mechanism is employed. That is, in the third embodiment, the planetary gear and clutch mechanism includes a main housing integrally connected to the one end of the output shaft, a ring gear provided at an inner periphery of the housing, a sun gear rotatably disposed on the main housing through a first clutch, planetary gears each in engagement between the sun gear and the ring gear, a rotary disc rotatably supporting the planetary gears and having an integral shaft to mount a pulley thereon, and a second clutch disposed between the main housing and the rotary disc. During low rotation range of the engine, the rotation of the integral shaft is directly transmitted to the pulley through the main housing, the second clutch and the rotary disc. On the other hand, during high rotation range of the engine, the coupling between the main housing and the rotary disc is released, so that the rotation of the output shaft is transmitted to the second pulley through the planetary gears.

These and other objects of the invention will become apparent from the description of the drawings and the preferred embodiments which follow:

DESCRIPTION OF THE PREFERRED EMBODIMENTS

Figure 1:
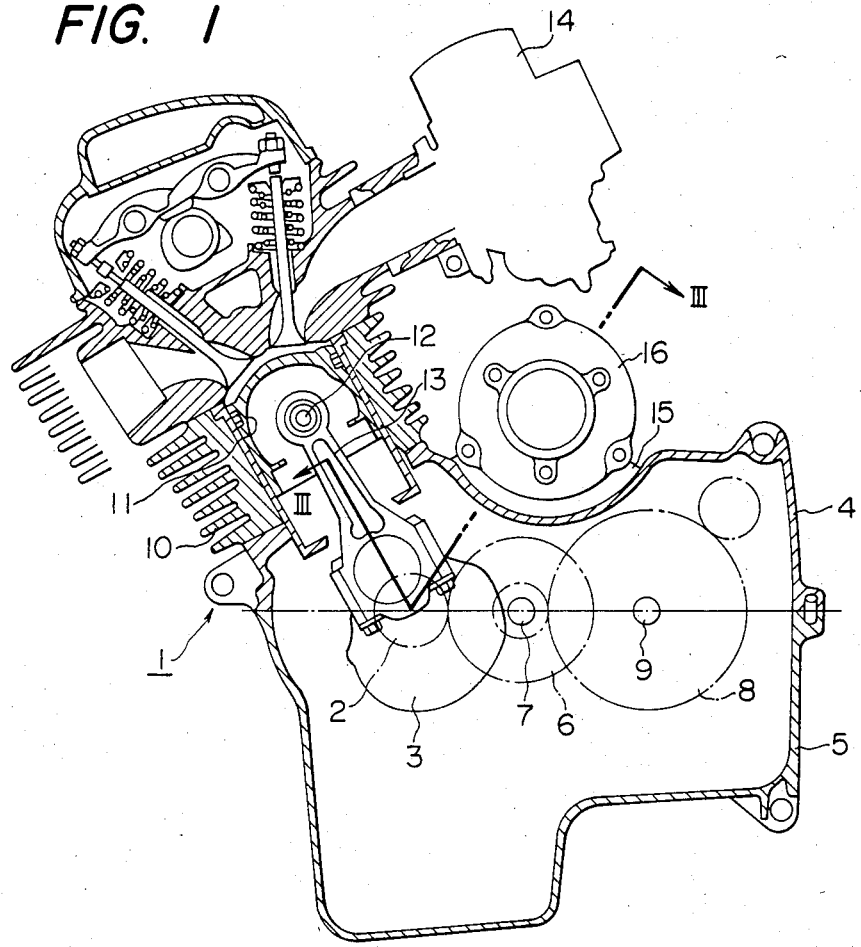
FIG. 1 is a vertical cross-sectional view of an engine for a motorcycle incorporating a device for driving an electrical current generator according to a present invention.
Figure 2:
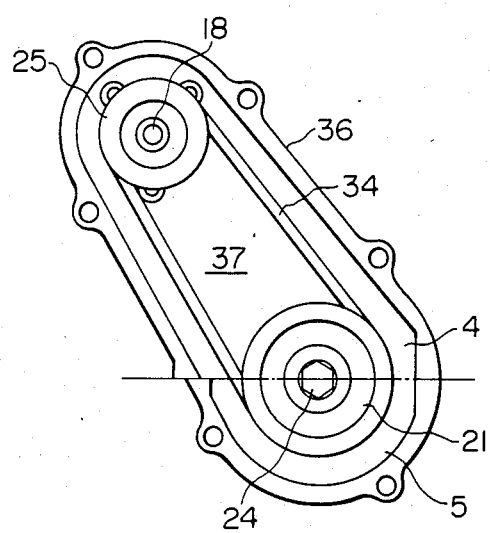
FIG. 2 is a front view of a device of the present invention, wherein a cover member is removed.
Figure 3:
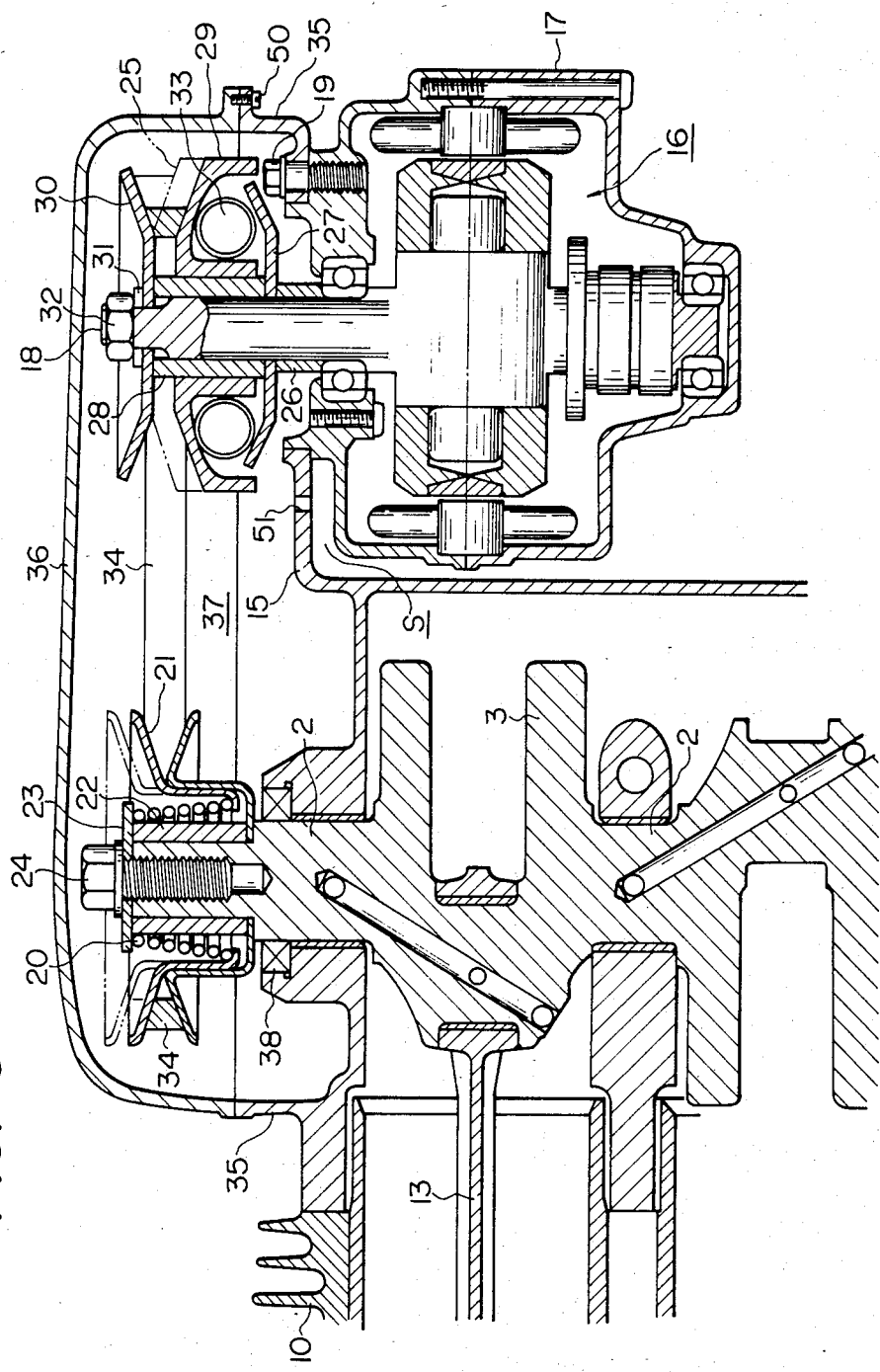
FIG. 3 is a cross-sectional view taken along a line III—III of FIG. 1.

A first embodiment of the present invention is shown in FIGS. 1 to 3, wherein an engine for a motorcycle is generally indicated by reference numeral 1. A crank case is divided into upper and lower casings 4 and 5 at a plane passing through a center axis of a crankshaft 2. At the boundary line between the upper and lower casings, a reduction gear 6 and shafts 7 and 9 of a transmission system 8 as well as the crankshaft 2 are rotatably supported.

At the upper right side of the upper crank casing 4 (unhatching portion in FIG. 1) a fixing flange 15 is integrally provided and extending upwardly in order to detachably fix a casing 17 of an alternator 16 by means of a bolt 19 (FIG. 3) to the flange 15. As a result, the alternator 16 can be positioned between the upper crank casing 4 and a carburetor 14 positioned above the upper casing 4.

Further, at right end of the crankshaft 2 (at the upper end in FIG. 3), a pulley 21 is mounted by means of a sleeve 22, washer 23 and a bolt 24. The pulley 21 provides an automatic tensioner function with the aid of a biasing force of a conical coil spring 20 disposed around the sleeve 22.

A rotary shaft 18 of the alternator 16 has one end provided with a centrifugal pulley 25 whose effective diameter changes in response to rotation speed thereof. That is, a V-belt 34 is in contact with the centrifugal pulley 25 whose diameter is changable to control the rotation of the shaft 18 of the alternator 16.

Specifically, as shown in FIG. 3, the centrifugal pulley 25 includes a sleeve 26, a ball holding disc 27, a sleeve 28, an inside pulley disc 29 balls 33 an outside pulley disc 30, a washer 31 and a bolt 32. The sleeve 26 is fitted over the rotary shaft 18, and the ball holding disc 27 is secured between the sleeves 26 and 28. The inside pulley disc 29 is axially movable along the sleeve 28, while relative rotation therebetween is prevented. The outside pulley disc 30 is secured between the sleeve 28 and the washer 31 and is fixedly mounted by the bolt 32. The balls 33 are supported between the ball holding disc 27 and the inside pulley disc 29. The V-belt 34 is mounted on a V-shaped groove defined by the inside and outside pulley discs 29 and 30.

According to the present invention, as shown in FIG. 3, a device for driving the generator which includes automatic tensioner pulley 21, the centrifugal pulley 25 and the V-belt 34 is positioned outside of the engine unit and is covered by a cover member 36 to provide a confined space 37. Specifically, a casing 35 is provided integral with the upper crank casing 4 and the fixing flange 15, and an open end of the cover member 36 is in alignment with the open end of the casing 35 to provide the confined space 37 in which these pulleys and the V-belt are provided. The cover member 36 is fixedly secured to the casing 35 by means of a bolt 50. In this case, a head of the bolt 50 is positioned at the casing 35, so that personnel can observe clear surface of the cover member 36 only, to thus enhance external appearance. Further, a breather hole 51 is formed at the confined space 37, specifically at the fixing flange 15. Since the fixing flange 15 confronts with the casing 17 of the alternator 16, and since relatively narrow space S is provided between the casing 17 and the flange 15, labyrinth path is provided therebetween to thus prevent dust or water from being entered into the confined space through the breather hole 51.

An oil seal 38 is provided between the upper crank casing 4 and the crankshaft 2, so that oil leakage from the crank chamber into the confined space 37 is prevented.

In operation, upon start of the engine 1 to rotate the crankshaft 2, the alternator 16 is rotated through the pulley 21, V belt 34 and the centrifugal pulley 25 to thereby generate DC electric power. In this case, if the engine is rotated at the low rotation range, the balls 33 are not subject to large centrifugal force, so that these are contacted with a sleeve portion of the inside pulley disc 29. Therefore, the inside pulley disc 29 maintains its axial position, and as a result, the V-belt 34 is mounted deeply in the pulley groove at the minimum diameter thereof. In this case, biasing force of the conical coil spring 20 maintains the pulley 21 to provide the largest diameter thereof. Therefore, even at the low rotation range of the engine, the rotation ratio of the alternator 16 to the rotation of the crankshaft can be maintained at maximum value. Accordingly, as shown by a solid line in FIG. 4, relatively high electrical current output is obtainable at the low rotation range of the engine in comparison with the conventional device, so that the electrical current for illuminator as well as for engine ignition can be supplied even at the idling range X.

On the other hand, if the engine speed is gradually increased, the balls 33 are subject to large centrifugal force, so that these are urged radially outwardly. In this instance, these balls 33 push the inclined portion of the inside pulley disc 29 to move the same upwardly in FIG. 3. As a result, the inside pulley disc 29 moves toward the outside pulley disc 30 as shown by chain line in FIG. 3, to thereby increase effective diameter of the pulley 25. In this case, in response to the increase of the effective diameter of the centrifugal pulley 25, the effective diameter of the automatic tensioner pulley 21 is decreased against the biasing force of the conical coil spring 20. As a result, the rotation ratio of the alternator to the rotation of the crankshaft is gradually decreased, and therefore, even if the engine speed is increased, the rotation of the alternator 16 can be maintained at constant level.

Figure 4:
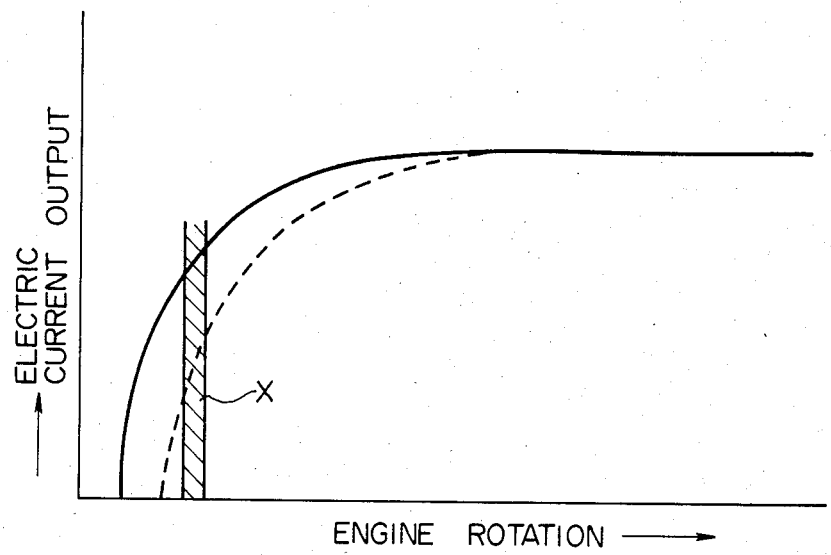
FIG. 4 is a graphical representation showing a relationship between an engine rotation speed and an output current.

In view of the above, according to the present invention, in spite of the high electric current output at the low rotation range of the engine in comparison with the conventional device, the electric current output at the high rotational range of the engine is substantially the same as that in the conventional device as shown in FIG. 4. Therefore, according to the present invention, electric current for illuminator as well as for engine ignition are suppliable in case of the motorcycle riding at the traffic jam metropolitan area, particularly, during midnight travel which requres electric power for illuminator.

Further, the casing 17 of the alternator 16 is completely separated from the crank chamber of the engine with the aid of the confined space 37, and is positioned spaced apart from the upper crank casing 4, so that thermal conduction from the engine 1 to the alternator 16 is blocked, to thereby enhance cooling efficiency of the alternator.

Furthermore, as shown in FIG. 1, since the alternator 16 is not positioned in axial alignment with the crankshaft 2, but is positioned above the upper crank casing 4, resultant width of the engine can be minimized, to thus provide confortable riding position for the motor rider.

Moreover, the pulleys 21 and 25 and the V-belt 24 those used for connecting the engine with the alternator 16 are sealingly positioned by the upper crank casing 4, flange 15, casing 35 and the cover member 36, so that these can be protected from the water or mud, and further, noise to the outside can be blocked.

Figure 5:
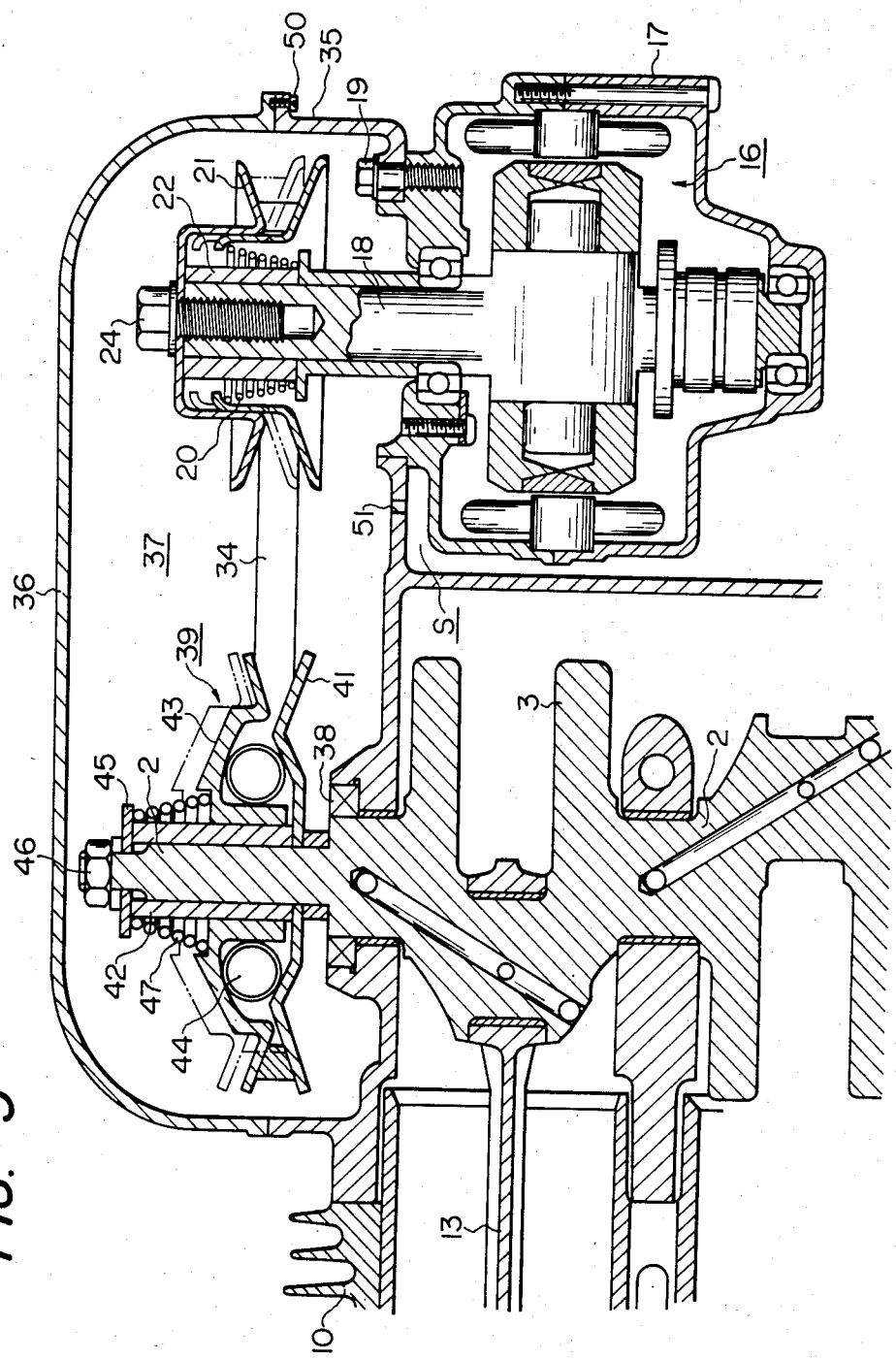
FIG. 5 is a cross-sectional view showing a second embodiment according to the present invention.

A second embodiment of the invention is shown in FIG. 5. According to the second embodiment, a centrifugal pulley 39 is disposed at one end of the crankshaft 2, and an automatic tensioner pulley 21 is disposed at one end of the rotary shaft of the alternator 16. Even by the reversal provision of these pulleys, the same function and effect are obtainable as in the case of the first embodiment. Specifically, according to the second embodiment, the centrifugal pulley 39 includes a sleeve 40 fitted over the crankshaft 2, an inside pulley disc 41 positioned outside of the sleeve 40 and fitted over the crankshaft 2, a sleeve 42 positioned outside of the disc 41 and fitted over the crankshaft 2, an outside pulley disc 43 axially movable relative to the sleeve 42 but anti-rotatable relative to the same, centrifugal balls 44 positioned between the inside and outside pulley discs 41, 43, a nut 46 to urge the sleeve 42 toward the inside pulley disc 41 through a washer 45 to thus integrally fix these to the crankshaft 2, and a conical coil spring 47 interposed between the outside pulley disc 43 and the washer 45. The inside pulley disc 41 also serves as a ball holding disc as in the case of the first embodiment (see 27 of FIG. 3).

The automatic tensioner pulley 21 of the second embodiment provides the positional arrangement quite opposite to that of the first embodiment, and is fitted at the rotary shaft 18 of the alternator 16. In both first and second embodiments, the V-belt 34 is shiftable along axial direction of the shfts 2 and 18 in response to the rotation of the crankshaft 2.

Figure 6:
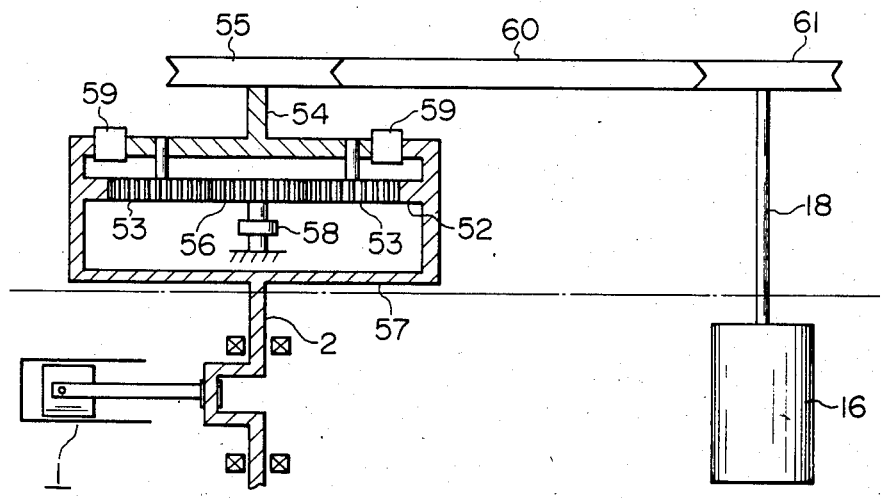
FIG. 6 is a schematic illustration showing a third embodiment according to the invention.

A third embodiment of the invention is shown in FIG. 6, wherein instead of the employments of the centrifugal pulley and the automatic tensioner pulley as in the cases of the foregoing embodiments, a combination of planetary gear mechanism and clutches are employed. That is, a ring gear 52 is formed at a main housing 57 and is integrally provided at one end of the crankshaft 2. The ring gear 52 is in meshing engagement with a plurality of planetary gears 53 each rotatably supported by a rotary disc. The rotary disc is integrally connected to a shaft 54 whose one end is provided with a pulley 55. A sun gear 56 is supported to the main housing 57 through a one way clutch 58. The one way cluth 58 permits the sun gear 56 to be rotated to the same rotational direction as that of the crankshaft 2, while prevent the reversal rotation of the sun gear. Each of the planetary gears 53 is engaged with both ring gear 52 and the sun gear 56. Between the crankshaft 2 and the out put shaft 54, a centrifugal clutches 59 are provided to provide engagement and disengagement therebetween. These centrifugal clutches provides engagement between the output shaft 54 and the crankshaft 2 when the rotation of the crankshaft 2 is at low level, so that the rotation of the crankshaft is directly transmitted to the pulley 55 through the cluth 59. In this case, the ring gear 2 becomes integral with the planetary gears 53, so that the sun gear 56 is also rotated integral with the planetary gears 53, since the rotation of the crankshaft 2 is transmitted to the sun gear 56 at the same rotational direction. If the rotation of the crankshaft exceeds predetermined level, the centrifugal clutches 59 release the direct engagement between the crankshaft 2 and the output shaft 54. Therefore, the rotation of the crankshaft 2 is transmitted to the output shaft 54 through the ring gear 52 and the planetary gears 53. In this case, rotational direction of the sun gear 58 becomes opposite to that of the crankshaft. However, since the one way clutch 58 prevents the rotation of the sun gear 56, the planetary gears are moved around the sun gear by the rotation of the ring gear 52, to thereby obtain reduced rotation of the rotary disc (output shaft 54) even at the high rotation of the crankshaft 2. The rotation of the pulley 55 is transmitted to a rotary shaft 18 of the alternator 16 through a belt 60 and a pulley 61. Apparently, instead of the centrifugal clutches 59, electromagnetic clutches can be employed. Further, instead of the employment of the pulleys and the V-belt, the combination of sprockets and an endless chain may be used.

Within the meaning of the primary concept of the present invention, the main housing 57, the output shaft 54, pulleys 55 and 61 and belt 61 be positioned within a confined space as mentioned in the foregoing embodiments.

Further it goes without saying that according to the present invention, another type of generator such as a dynamo is employable instead of the alternator. Furthermore, the subject invention is applicable to four wheel automobile as well as the motorcycle.

According to the present invention, at the low rotation range of the engine, high rotation ratio of the alternator to that of the engine is obtainable, whereas at the high rotational range of the engine, the rotation ratio is not become increased, so that high electrical current output is obtainable at the low rotation range of the engine yet keeping upper limit of the rotation of the alternator within an allowable range thereof at the high rotation range of the engine.

While the invention has been described in detail and with reference to specific embodiment thereof, it will be apparent to one skilled in the art that various changes and modifications can be made therein without departing from the spirit and scope of the invention.

What is claimed is:

1. A device for driving an electrical current generator for use in a motorcycle comprising:
   (a) an engine unit for housing an engine of said motorcycle;

(b) said electrical current generator provided separately from and mounted outside of said engine unit;

(c) power transmission means provided between one end of an output shaft of said engine and one end of a rotary shaft of said generator and comprising:

a V-belt;

a first pulley mounted on one of said one ends of said output shaft and said rotary shaft; and a second pulley mounted on the other of said one end, said second pulley including means for increasing a rotational speed ratio of said rotary shaft to said output shaft during low rotation range of said engine and decreasing said ratio during high rotation range thereof, said V-belt being mounted between said first pulley and said second pulley, said engine unit and said electrical current generator being provided at the same side of said power transmission means;

said power transmission means further comprising;

an endless transmission member;

a planetary gear and clutch mechanism connected to said one end of said output shaft;

a first pulley mounted on said planetary gear and clutch mechanism, and a second pulley mounted on said one end of said rotary shaft, said V-belt being mounted between said first and second pulleys; and (d) covering means providing a confined space outside of said engine unit for housing said power transmission means within said confined space separate from said electric current generator.

2. A device of claim 1, wherein said power transmission means comprises;

(a) as V-belt;

(b) a first pulley mounted on one of said one ends of said output shaft and said rotary shaft; and (c) a second pulley mounted on the other of said one end, said second pulley including means for increasing a rotational speed ratio of said rotary shaft to said output shaft during low rotation range of said engine and decreasing said ratio during high rotation range thereof, said V-belt being mounted between said first pulley and said second pulley.

3. A device of claim 2, wherein said first pulley is mounted on said one end of said output shaft and said second pulley is mounted on said one end of said rotary shaft.

4. A device of claim 3, wherein said second pulley comprises;

(a) a ball holding disc fixedly secured to said one end of said rotary shaft;

(b) an inside pulley disc positioned outside of said ball holding disc and slidable along axial direction of said rotary shaft, while relative rotation of said inside pulley disc to said rotary shaft being prevented;

(c) a plurality of balls supported between said ball holding disc and said inside pulley disc; and (d) an outside pulley disc positioned outside of said inside pulley disc and fixedly secured to said one end of said rotary shaft, upon rotation of said output shaft, said balls being urged radially outwardly to thereby move said inside pulley disc toward said outside pulley disc, to thus change effective diameter of said second pulley for mounting said V-belt.

5. A device of claim 3, wherein said first pulley comprises:

(a) a stationary pulley disc fixedly secured to said one end of said output shaft;

(b) a movable pulley disc positioned outside of said stationary pulley disc; and, (c) a coil spring urging said movable pulley disc toward said stationary pulley disc, a distance between said stationary and movable pulley discs being changed in response to rotation speed of said second pulley to thereby change effective diameter of said first pulley for mounting said V-belt.

6. A device of claim 2, wherein said first pulley is mounted on said one end of said rotary shaft and said second pulley is mounted on said one end of said output shaft.

7. A device of claim 6, wherein said second pulley comprises;

(a) an inside pulley disc fixedly secure to said one end of said output shaft;

(b) an outside pulley disc positioned outside of said inside pulley disc and slidable along axial direction of said output shaft while rotation of said outside pulley disc relative to said output shaft being prevented;

(c) a plurality of balls supported between said inside and outside pulley discs; and (d) a coil spring positioned outside of said outside pulley disc and adapted to urge said outside pulley disc toward said inside pulley disc.

8. A device of claim 6, wherein said first pulley comprises;

(a) a stationary pulley disc fixedly secured to said one end of said rotary shaft;

(b) a movable pulley disc positioned inside of said stationary pulley and slidable along axial direction of said rotary shaft; and, (c) a coil spring positioned inside of said movable pulley disc and adapted to urge said movable pulley disc toward said stationary pulley disc, a distance between said stationary and movable pulley discs being changable in response to rotation speed of said second pulley.

9. A device of claim 1, wherein said planetary gear and clutch mechanism comprises;

(a) a main housing integrally connected to said one end of said output shaft, said housing having an inner surface formed with a ring gear;

(b) a sun gear rotatably disposed on said main housing through a first clutch;

(c) planetary gears each being in engagement between said ring gear and said sun gear, each of said planeraty gears being rotatably supported on a rotary disc member integrally connected to said first pulley; and (d) a second clutch disposed between said main housing and said rotary disc.

* * * * *